May 29, 1928.
G. B. BURCH
1,671,508
ELECTRIC PHONOGRAPH
Original Filed March 8, 1918  6 Sheets-Sheet 4
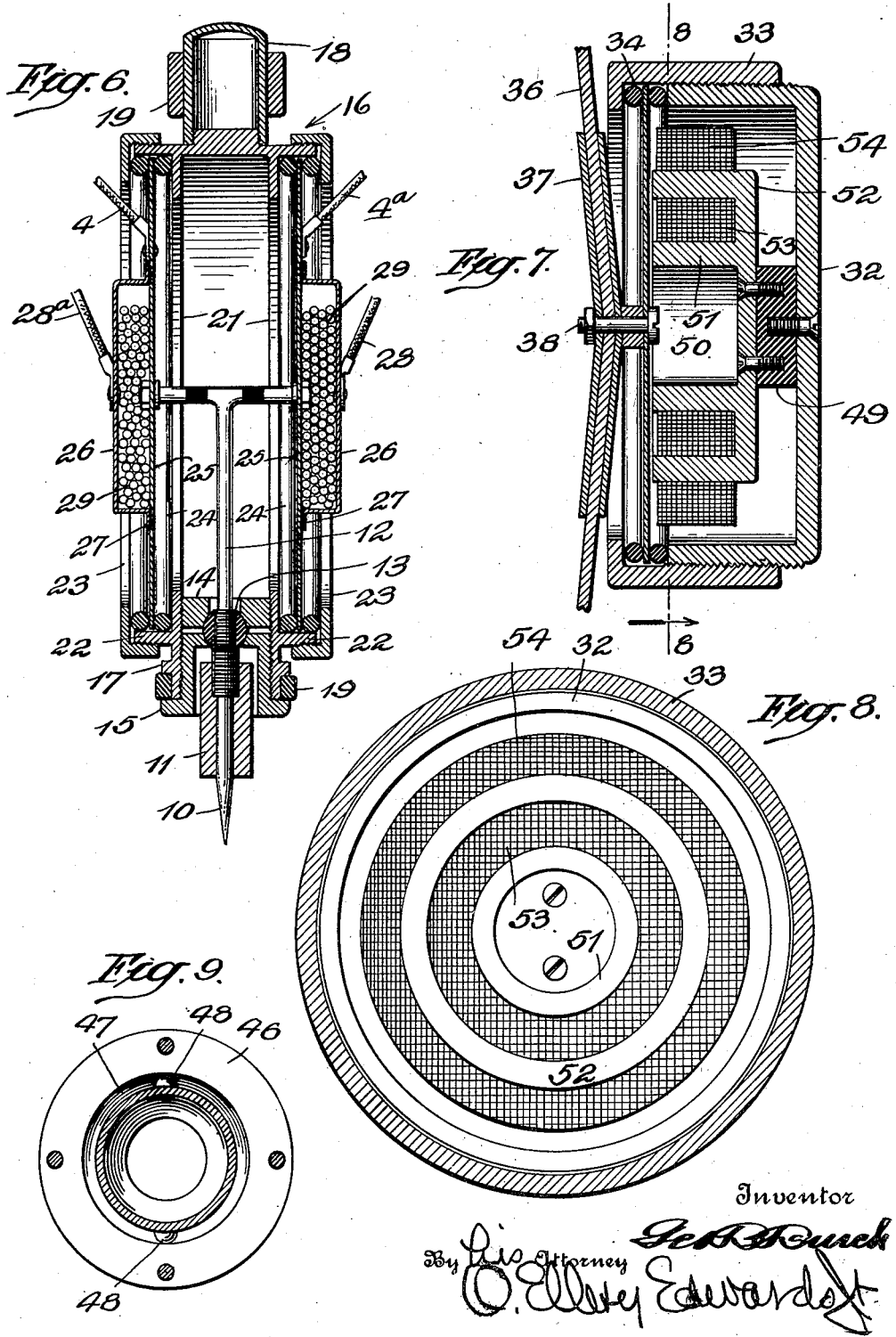

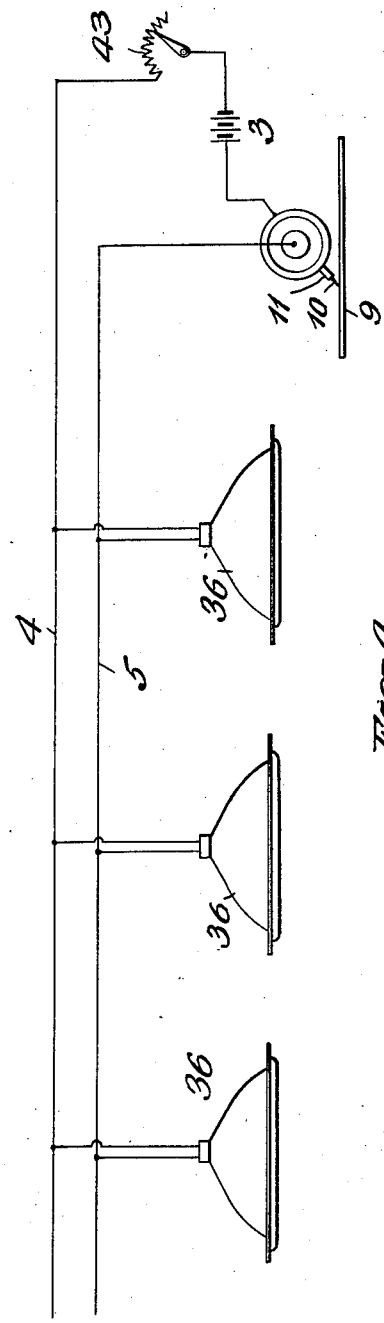
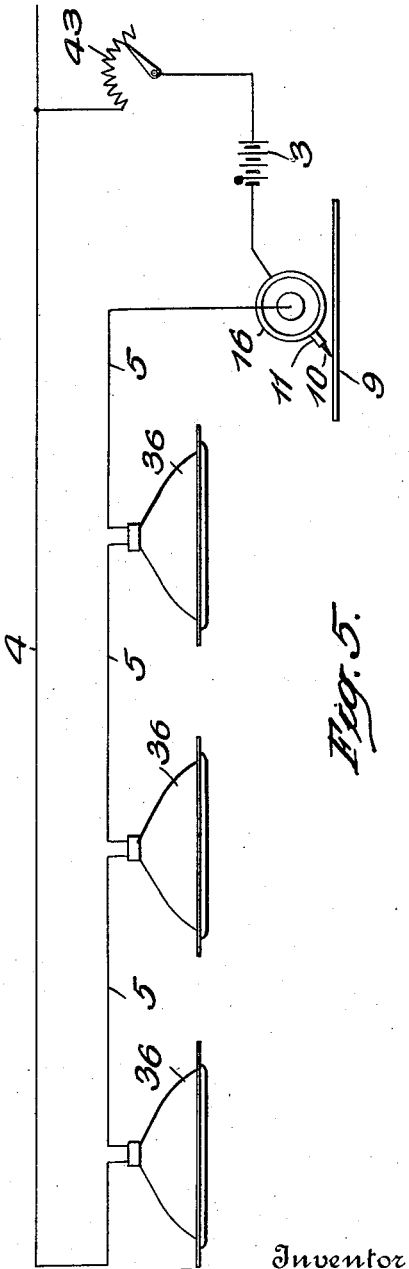

May 29, 1928. 1,671,508
G. B. BURCH
ELECTRIC PHONOGRAPH
Original Filed March 8, 1918   6 Sheets-Sheet 5

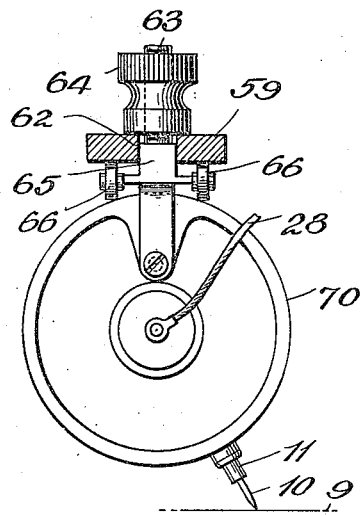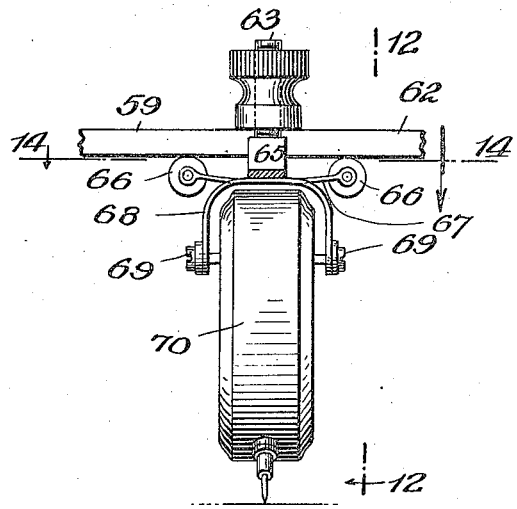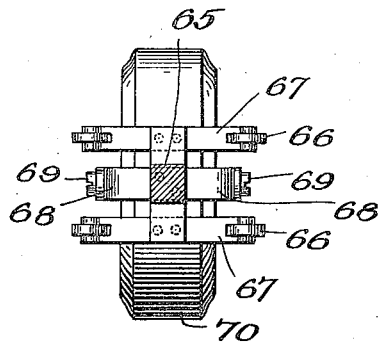

Patented May 29, 1928.

1,671,508

UNITED STATES PATENT OFFICE.

GEORGE B. BURCH, OF NEW YORK, N. Y., ASSIGNOR TO LESLIE STEVENS, OF GLEN RIDGE, NEW JERSEY.

ELECTRIC PHONOGRAPH.

Application filed March 8, 1918, Serial No. 221,283. Renewed September 25, 1926.

The object of my invention is to provide a phonograph which will have a rotating table carrying a record which engages a needle which is connected to a peculiar transmitting apparatus analogous to the transmitter of a telephone which modifies electric waves which correspond with the sound waves from which the record was produced, and these electric waves are transmitted by wires, or other suitable conductors, to one or more electromagnets adjacent to one or more sound producing diaphragms. The electric current passing through the conductors, transmitter and magnets may be varied according to the loudness of reproduction that is desired. This object is accomplished by my invention, some embodiments of which are hereinafter more particularly set forth.

For a more detailed statement of my invention, reference is to be had to the accompanying drawings, forming a part hereof, in which, Figure 1 is a sectional view of one form of phonograph embodying my invention;

Figures 4 and 5 are diagrammatic views showing a plurality of sound reproducing instruments connected to one transmitter. In Figure 4 the sound reproducing instruments are shown in parallel, and in Figure 5, in series;

Figure 6 is a sectional view, somewhat enlarged, of one form of transmitting apparatus;

Figure 7 is a corresponding view of a portion of one form of receiving apparatus;

Figure 8 is a sectional view taken on the line 8—8 of Figure 7 looking in the direction of the arrows;

Figure 9 is a sectional view taken on the line 9—9 of Figure 1, looking in the direction of the arrows;

Figure 10:
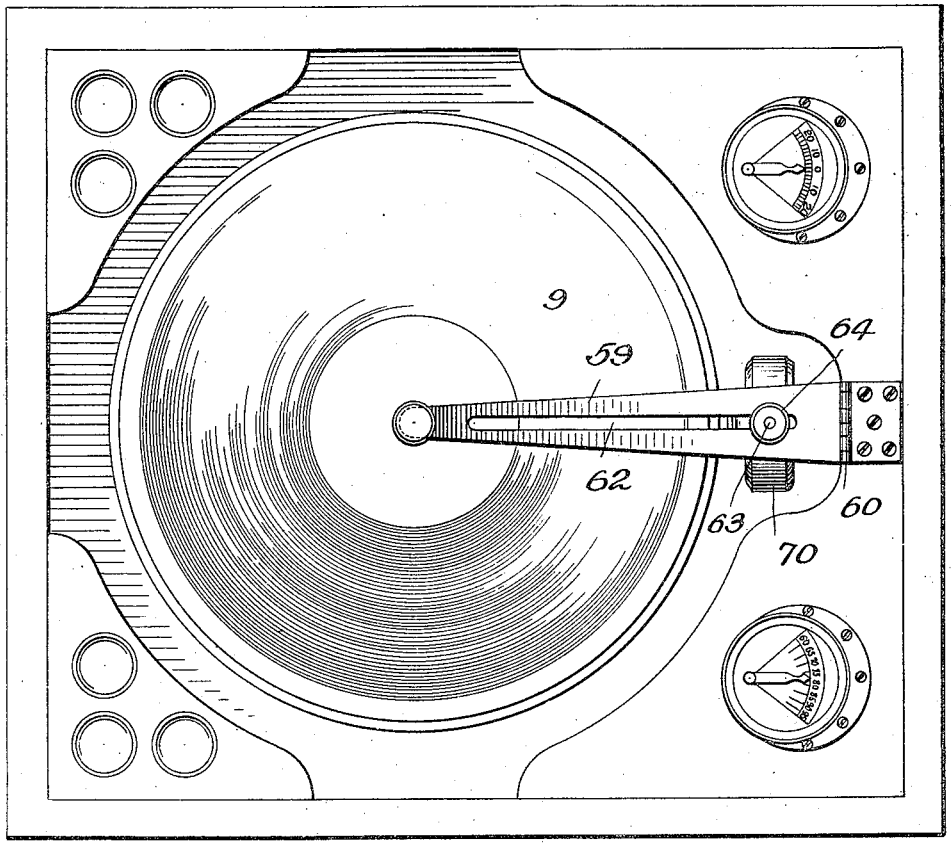
Figure 10 is a plan view of a modified form of rotary table and its connected parts.
Figure 11:
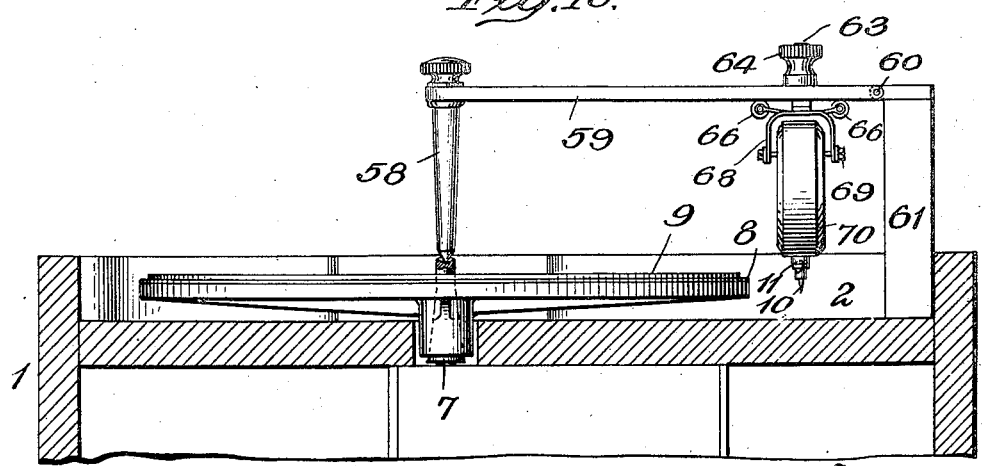
Figure 11 is a sectional view of the structure shown in Figure 10.

Figures 12, 13, and 14 show the mounting of a modified form of transmitter shown in Figures 10 and 11. Figure 12 is a sectional view taken substantially on the line 12—12 of Figure 13, looking in the direction of the arrows, and Figure 14 is another section on the same figure taken on the line 14—14 as indicated.

Throughout the various views of the drawings, similar reference characters designate similar parts.

Figure 1:
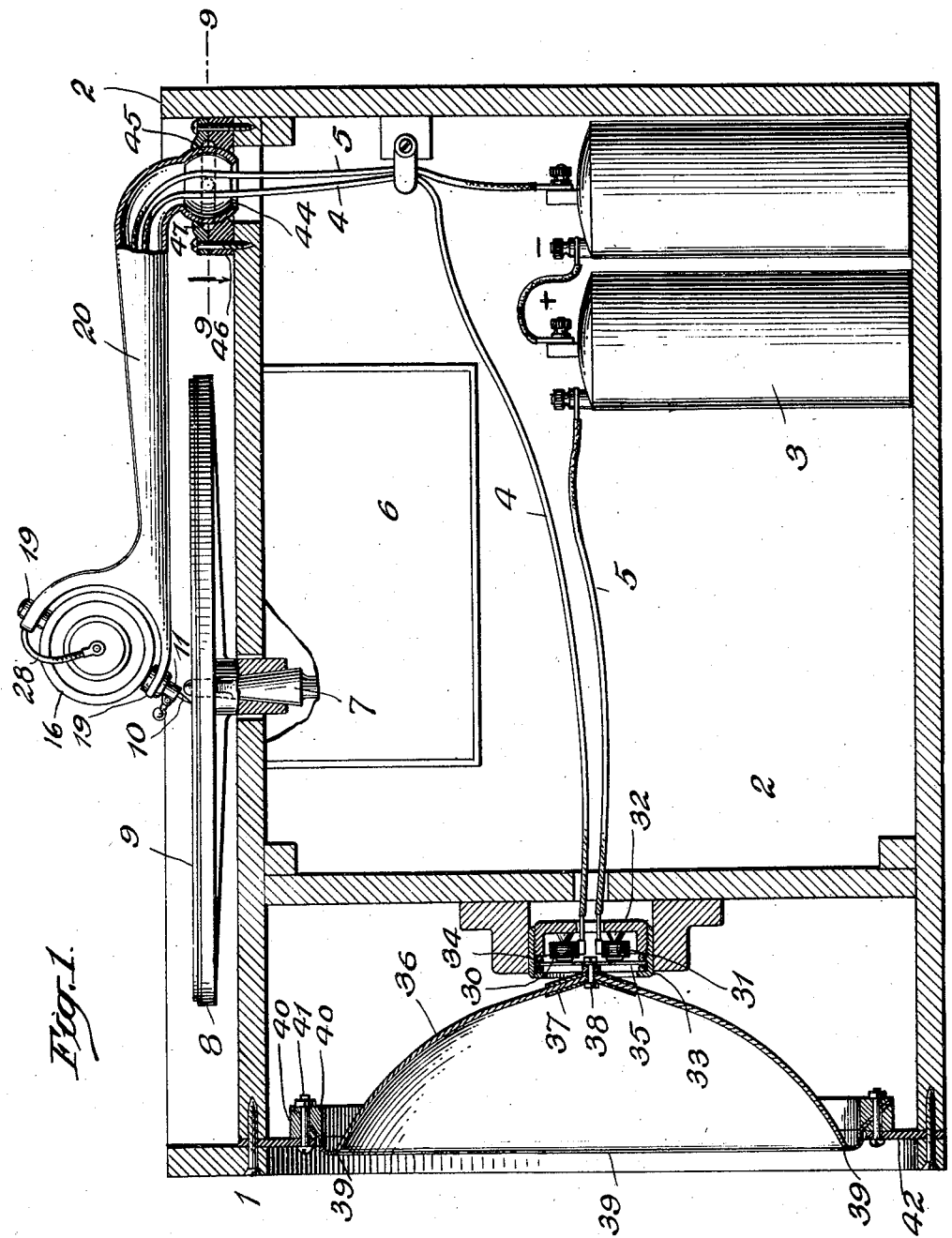

In the embodiment of my invention shown in Figure 1, the phonograph 1 is provided with any suitable casing 2, in which is mounted a battery 3. If desired, any other suitable source of electrical supply may be substituted. In this embodiment the battery 3 is connected in the conventional manner in series with the main wires 4 and 5 which are connected as will be described below. Near the top of the casing 2 there is provided a motor 6 which may be either electric or clock, as desired, and this motor is provided with a vertically extending shaft 7 that carries a turntable 8 in the conventional manner. For convenience the brake and speed regulating mechanisms are omitted from the drawing so as to simplify the construction which is represented, although it is to be understood that they are applied in the conventional way.

The turntable 8 carries a suitable record 9 which may be a record with a groove of varying depth, or a record with a groove of undulating width as either form of record will operate equally well in the apparatus. In the embodiment shown, the record 9 is supposed to have a uniform depth and a thread that varies horizontally, and the transmitter is arranged accordingly. For the other kind of record the transmitter is turned at right angles to the position shown.

The record 9 is engaged by a needle, or stylus, 10 which is held in a needle, or stylus holder 11 by a clamp screw, not shown, or in any other suitable manner. The needle holder 11 is fixed to the needle bar 12, see Figure 6, which bar is secured to a suitable ball 13 that has a mounting between the washers 14 and 15, substantially as shown.

This permits a limited universal movement of the needle bar 12 so that this bar can always respond perfectly and freely to the vibrations transmitted to it from the needle 10. The washers 14 and 15 are mounted in a suitable casing 16 which will now be described.

This casing 16 is pivotally mounted on the axis of the needle bar 12 and needle 10, or substantially this axis, by means of corresponding projections 17 and 18, which engage corresponding bearings 19 in the swinging arm 20 as shown in Figure 1. The washer 15 is preferably provided with a shoulder, as shown in Figure 6, so that the lower bearing 19 may be clamped, as indicated, so as to prevent the casing 16 from turning too freely. This casing 16 also has inwardly extending collars 21 and cylindrical extensions 22 which are engaged by annular caps 23 for a purpose which now will be set forth.

Two rubber or other washers 24 with a diaphragm of metal 25 held between them, and clamped against the shoulders 21 by these annular caps 23, with the result that the diaphragms 25 may vibrate under the influence of the needle bar 12 to which they are securely attached at their centers as indicated. Each diaphragm 25 carries at its center a suitable cap 26 of metal fixedly secured to its respective diaphragm 25 at its edges, with insulation 27 intervening between, and a conductor 28 is fixed to each cap 26. Carbon 29, or other suitable granular material, is put in between the cap 26 and the corresponding disk 25, thus forming a microphone cell, and the conductors 28 are connected together and these discs 25 are connected to the wire 4. The conductor 28 is connected to the wire 5 and the conductor 4ª is connected to wire 28ª so that when the apparatus is as shown in Figure 1, a small current will always pass from the battery 3 from one pole of this battery through the wire 4, the two diaphragms 25, and carbon 29 in series, and conductor 28 to the wire 5, and thence back to the battery 3, thus completing the circuit.

It is also apparent that the needle 10 will transmit vibrations directly to the diaphragms 25 of the double unit telephone transmitter above described through the needle bar 12, and that these vibrations will agitate the carbon 29 and change its resistence so that the electric current through this carbon, passing as above described, will be modified so as to correspond with the modifications of the sound wave which the thread on the record 9 represents.

The wires 4 and 5 are also connected to suitable magnets 30 and 31 of a telephone receiving unit which is shown in one form, in Figure 1, and in another form in Figures 7 and 8. These magnets rest in a suitable housing 32 which is surmounted by an annular cap 33 which comprises washers 34 against a sheet iron diaphragm forming the armature member of the unit 35 so that this diaphragm will vibrate in unison with the diaphragms 25, because the magnets 31 and 30 are connected to the conductors 4 and 5 which are also connected to the transmitting apparatus as above set forth. The vibrations of the diaphragm 35 are not sufficient to give the requisite loudness which is required of the instrument if it is to be practical. To produce this loudness, some amplifying means is required.

In the embodiments of my invention herein set forth, I have shown what is the best amplifying means known to me, namely, a large paper diaphragm 36 which at its center is clamped between washers 37 by a bolt 38 which is also fixedly connected to the center of the diaphragm 35 so that all vibrations of the diaphragm 35 due to the magnets 30 and 31 are accurately transmitted to the diaphragm 36. This diaphragm 36 is of dished form and desirably has a thickened central portion and tapers towards its edge, and at its gutter 39 is made very thin. The extreme edge of the diaphragm 36 is clamped between suitable clamping rings 40 which are held by bolts 41 against any suitable support 42 which in turn is fixed to the casing 2.

When the apparatus is used as shown in Figures 4 and 5 a plurality of reproducing diaphragms 36 are employed, the magnets 30, 31 of which may be connected either in parallel, as shown in Figure 4, or in series as shown in Figure 5. In either event the loudness of tone will depend upon the intensity of the currents passing through the magnets 30 and 31 and this will depend upon the resistance of the circuit and the strength of the battery 3.

In the preferred embodiment of my invention, I interpose a rheostat 43 in circuit at any convenient location so that the tone intensity may be under the control of the operator. One such rheostat is shown in these figures, but it is obvious that if desired, a separate rheostat may be provided for each diaphragm 36.

From Figures 4 and 5 it is apparent that as many of these diaphragms 36, with their attendant parts, may be employed as desired, and all operated from a single transmitting apparatus, and that these diaphragms may be placed in a single room, as a ball room, or a number of rooms, as the separate dining rooms of a large hotel. In any event, each will accurately reproduce the music which cause the irregularities in the record 9, and furthermore, these diaphragms 36 will not reproduce the scratching of the needle on this record unless the record is worn to such an extent that the thread is substantially injured. In any event, the scratching is greatly reduced, if not entirely eliminated, and is much less than when the record is used on a mechanical instrument of the usual character.

The swinging arm 20 may be mounted in any suitable way, and made in any suitable form. It is preferably made hollow, as indicated, with a ball and socket joint at its end 44, which is next to the cabinet. The socket is composed of two parts, 45 and 46, which are secured together by suitable screws and they are provided with an enlarged groove 47 which engages corresponding trunnions 48 (see Figure 9) which prevent the arm 20 from tipping or canting over on one side or the other.

In Figures 7 and 8, a telephone receiving unit having a peculiar form of magnet is shown for the receiving part of the apparatus as will now appear. The casing 32 carries at its center a suitable rubber or similar block 49 on which is mounted the core 50 of the magnet, and this core is held in any suitable manner, as by screws. This core 50 has two concentric collars 51 and 52 on which are coils 53 and 54 which are wound in opposite directions so as to cause opposite polarity in the collars 51 and 52. These coils 53 and 54 are connected to the wires 4 and 5 in any suitable manner.

Figure 2:
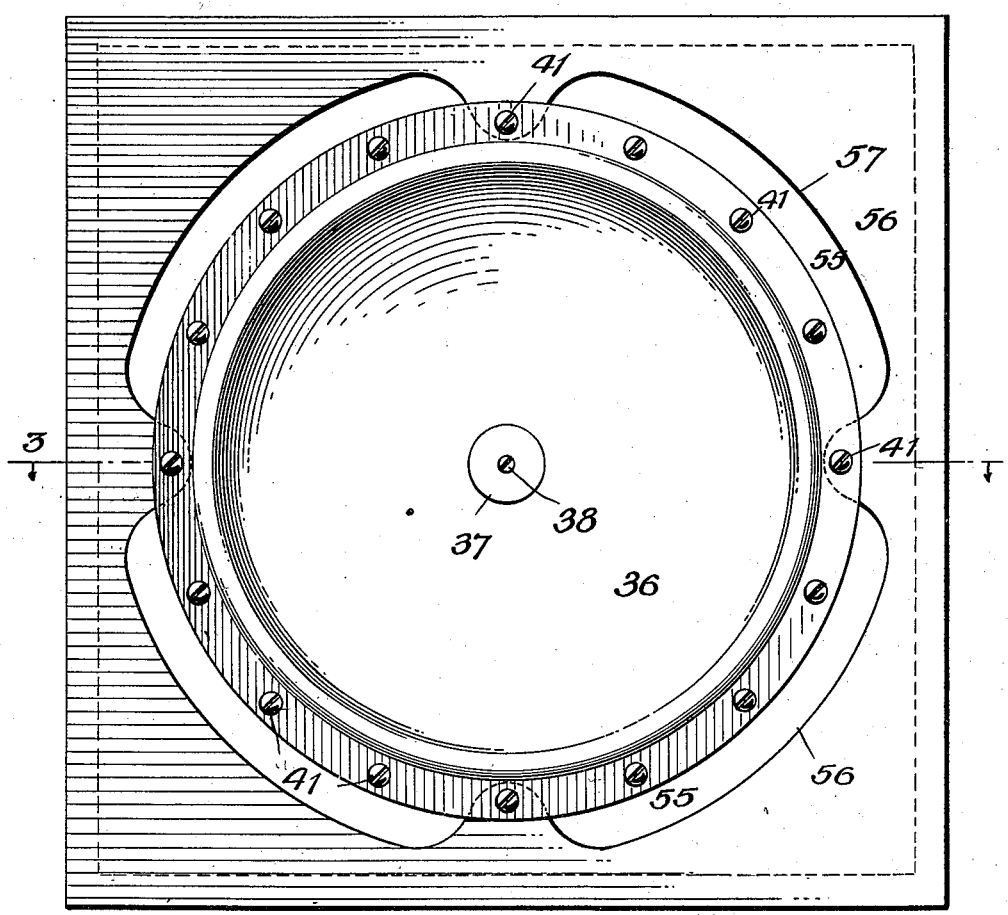
Figure 2 is a plan view of a sound reproducing device which may be put in any desired location provided the wiring is properly connected to the transmitting apparatus.
Figure 3:
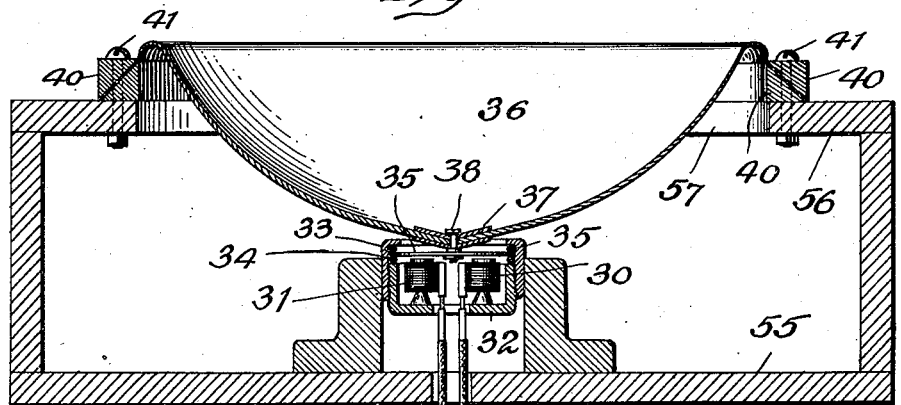
Figure 3 is a sectional view taken on the line 3—3 of Figure 2, looking in the direction of the arrows.

In Figures 2 and 3 are shown a suitable box 55 in which the dished diaphragm 36 may be mounted, if desired. This box 55 has a cover 56 provided with perforations 57 near the rings 40 for permitting sound waves to be emitted. These boxes 55 may be made in any form to be placed anywhere that may be desirable to enable them to support the diaphragms as indicated in Figures 4 and 5.

In Figures 10 to 14 inclusive is found a modified form of transmitting apparatus in which the rotary table 8 and record 9 are the same as before. The manner in which the transmitting apparatus is mounted is, however, somewhat modified, and made more heavy and sturdy for heavier work. Here the center of the upright shaft 7 engages a center 58 which is fixed in the forward end of a slotted, hinged arm 59 which is hinged at 60 to an upright 61 which is fixed to the cabinet 2 in any suitable manner.

The horizontally disposed and hinged arm 59 is held true by the hinge 60 at one end and the center 58 at the other, and extending through its slot 62 is a suitable bolt 63 with a nut 64 mounted thereon which engages the arm 59 with a sliding contact. The bolt 63 enters a cross head 65 which has a sliding fit with the slot 62, and carries anti-friction rollers 66 mounted on spring arms 67 fixed to this cross head so that these rollers ride on the under surface of the arm 59, as shown. This cross head 65 also carries a bracket 68 which extends downwardly as shown in Figure 13 and is provided at its lower end with pivot screws 69 that support a casing 70 which is similar to the casing 16, and carries the electric apparatus therein described.

This casing 70 also carries a needle holder 11 and needle 10 as above set forth, so that further description is unnecessary, it being understood that a needle 10 engages a record 9 much as above described, except that the arm 59 is fixed when the apparatus is in use, and does not swing as does the arm 20, so that the casing 70 and its attached parts can swing only on the pivots 69, although this casing can move in a straight line, so that the different positions of the casing are always parallel to each other.

For this reason, it is apparent that the needle 10 will always strike the groove in the record 9 at precisely the same angle and not at a slightly varying angle as is the case where the arm 20 is employed. This slight difference makes the apparatus of this embodiment of my invention more suitable for heavy work. Moreover, there is an additional advantage in that the exact weight which is to be carried by the needle 10 can be regulated by designing the apparatus so that the pivots 69 will be more or less removed from the center of gravity of the casing 70. The closer these pivots are to this point, the less weight will be placed on the needle 10, and this is true no matter how large and powerful this apparatus may be. What is desirable is that the weight on the needle 10 should be a minimum provided a proper contact between the needle and the groove is always obtained, and the apparatus should be designed accordingly.

In this embodiment of my invention, the connections for the wire 28 are not disclosed as it is understood that they may be of any suitable kind. When the record 9 is removed, the arm 59 and its attached parts can be raised on the hinge 60 as a pivot and placed clear of the record.

While I have shown and described some embodiments of my invention, it is obvious that it is not restricted thereto, but may be modified or varied in any of many ways without in any way departing from its spirit as set forth in the annexed claim.

Having thus described my invention, what I claim is:

In a device of the class described, the combination with a diaphragm and a stylus holder connected to the diaphragm for transmitting vibrations thereto from a sound record, and a microphone cell carried by and supported solely by the diaphragm, the microphone cell being of substantially less diameter than the diaphragm and the central portion of the diaphragm forming one wall of the microphone cell.

GEORGE B. BURCH.